(12) United States Patent
Dementev et al.

(10) Patent No.: US 8,597,605 B2
(45) Date of Patent: Dec. 3, 2013

(54) PURIFICATION OF SINGLE WALLED CARBON NANOTUBES BY DYNAMIC ANNEALING

(75) Inventors: Nikolay N. Dementev, Fukuoka (JP); Eric U. Borguet, Merion Station, PA (US)

(73) Assignee: Temple University—of the Commonwealth System of Higher Education, Philadelphia, PA (US)

( * ) Notice: Subject to any disclaimer, the term of this patent is extended or adjusted under 35 U.S.C. 154(b) by 64 days.

(21) Appl. No.: 13/128,420

(22) PCT Filed: Nov. 11, 2009

(86) PCT No.: PCT/US2009/063947
§ 371 (c)(1),
(2), (4) Date: Jun. 22, 2011

(87) PCT Pub. No.: WO2010/059467
PCT Pub. Date: May 27, 2010

(65) Prior Publication Data
US 2011/0274611 A1    Nov. 10, 2011

Related U.S. Application Data

(60) Provisional application No. 61/114,679, filed on Nov. 14, 2008.

(51) Int. Cl.
*C01B 31/00* (2006.01)
*C01B 31/02* (2006.01)
*D01F 9/12* (2006.01)

(52) U.S. Cl.
USPC ............... 423/445 R; 423/447.1; 423/447.2; 423/461; 423/414

(58) Field of Classification Search
USPC .......................................... 423/461; 977/845
See application file for complete search history.

(56) References Cited

U.S. PATENT DOCUMENTS

2003/0143356 A1    7/2003   Morikawa

FOREIGN PATENT DOCUMENTS

| EP | 1061042 A1 | 12/2000 |
|----|----|----|
| JP | 2004-277279 A | * 10/2004 |
| WO | 02064869 | 8/2002 |
| WO | WO 2004/052781 A1 | * 6/2004 |

OTHER PUBLICATIONS

Xu et al., "Controlled Multistep Purification of Single-Walled Carbon Nanotubes," 2005, Nano Letters, vol. 5, No. 1, pp. 163-168.*
Chen et al., "Non-destructive purification of multi-walled carbon nanotubes produced by catalyzed CVD," 2002, Materials Letters, 57, pp. 734-738.*
Koseki Shoken et al., JP 2004-277279 A translation, Oct. 2004.*
DataBase WPI Week 200158 Thomas Scientific, London, GB; Apr. 6, 2001.
International Search Report mailed Dec. 3, 2010.
Dementev et al., "Purification of carbon nanotubes by dynamic oxidation in air," J. Mater. Chem., 2009, vol. 19, pp. 7904-7908.

* cited by examiner

*Primary Examiner* — Bijay Saha
(74) *Attorney, Agent, or Firm* — RatnerPrestia

(57) ABSTRACT

A method for removing impurities from carbon nanotubes is described. Impurities may be removed from the carbon nanotubes by exposing the carbon nanotubes to a temperature, and controlling the temperature such that the temperature is constantly increasing to remove at least a portion of the impurities from the carbon nanotubes.

10 Claims, 5 Drawing Sheets

PURIFICATION OF SINGLE WALLED CARBON NANOTUBES BY DYNAMIC ANNEALING

CROSS-REFERENCE TO RELATED APPLICATIONS

This application is the U.S. national phase application of PCT International Patent Application PCT/US09/063,947 filed Nov. 11, 2009 which claims priority to U.S. Provisional Application No. 61/114,679 filed Nov. 14, 2008. The contents of these applications are incorporated by reference herein in their entirety.

FIELD OF THE INVENTION

The present invention relates to nanotechnology and, more particularly, to methods and apparatus for purifying carbon nanotubes.

BACKGROUND OF THE INVENTION

Carbon nanotubes are nanoscopic allotropes of carbon possessing unique mechanical and electrical properties which can be useful for a number of applications. Carbon nanotubes may contain impurities. These impurities can impede or diminish the unique properties of carbon nanotubes. Therefore, it can be is useful to remove impurities from carbon nanotubes to preserve their useful properties.

One method for removing impurities includes annealing the carbon nanotubes at a constant temperature in the presence of an oxidizing agent. This method removes impurities by heating them until they combine with the oxidizing agent and leave the carbon nanotubes. This annealing, however, may damage the carbon nanotubes as well. Therefore, there is a need for an improved method for removing impurities from carbon nanotubes.

SUMMARY OF THE INVENTION

The present invention is embodied in a method for removing impurities from carbon nanotubes. Impurities may be removed from the carbon nanotubes by exposing the carbon nanotubes to a temperature, and controlling the temperature such that the temperature is constantly increasing to remove at least a portion of the impurities from the carbon nanotubes.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale. On the contrary, the dimensions of the various features are arbitrarily expanded or reduced for clarity. Included in the drawings are the following figures.

DETAILED DESCRIPTION OF THE INVENTION

Figure 1:
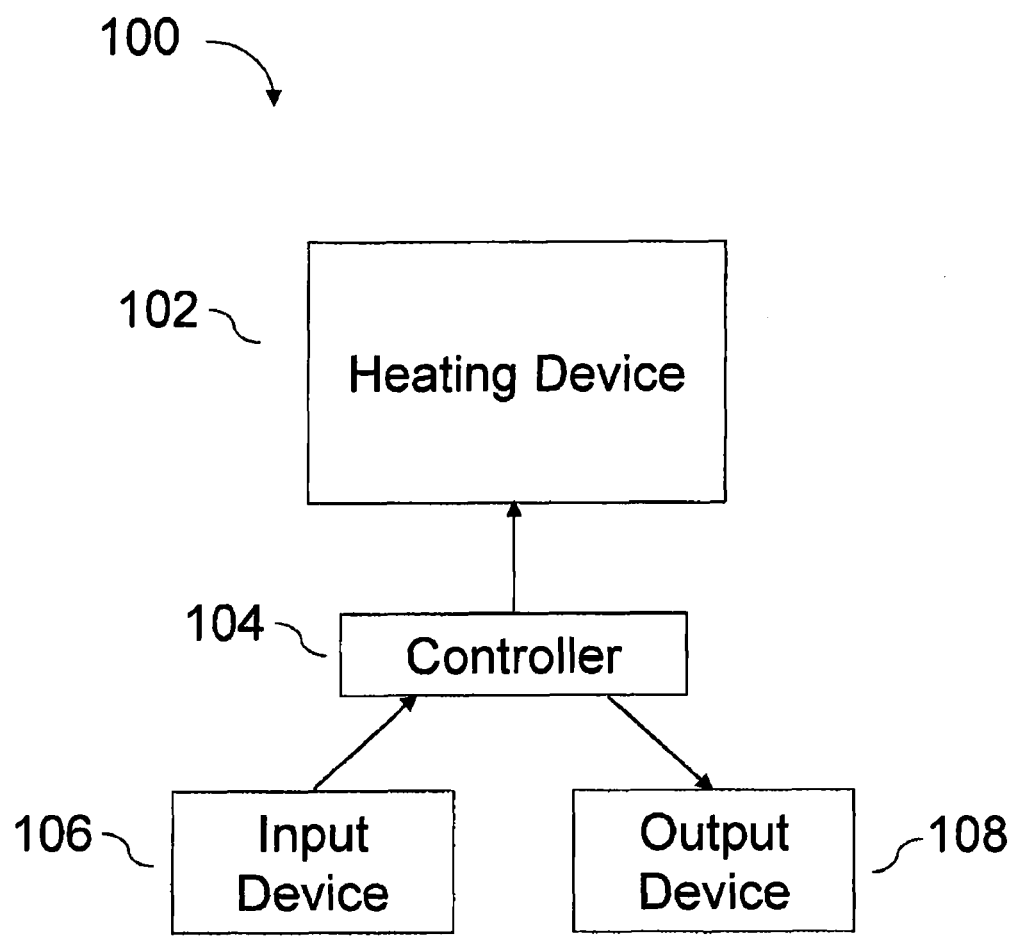
FIG. 1 is a block diagram depicting an exemplary system for removing impurities from a carbon nanotube material in accordance with an aspect of the present invention.

FIG. 1 depicts an exemplary system 100 for removing carbonaceous impurities from a carbon nanomaterial in accordance with one aspect of the present invention. The impurities may consist of carbonaceous impurities such as, for example, amorphous carbon, graphitic carbon, fullerenes, or carbon onions. The invention also facilitates the removal of metallic impurities such as, for example, iron, nickel, or yttrium. The carbon nanomaterial may be, for example, single walled carbon nanotubes, multi-walled carbon nanotubes, or other carbon nanostructures. The single walled carbon nanotubes may be as-produced single walled carbon nanotubes or pre-treated single walled carbon nanotubes. As used herein, the term as-produced single walled carbon nanotubes means single walled carbon nanotubes which have not been purified.

As a general overview, system 100 includes a heating device 102, a controller 104, an input device 106, and an output device 108. Additional details of system 100 are provided below.

Heating device 102 heats the carbon nanotubes. The carbon nanotubes may contain impurities. During the heating process, heating device 102 may expose the carbon nanotubes to a constantly increasing temperature. In an exemplary embodiment, the exposed temperature may increase at a linear rate over time. The exposed temperature may increase, for example, at a rate greater than 5 degree Celsius per minute, e.g., 10 degrees Celsius per minute. In an alternative exemplary embodiment, the temperature may increase at a non-linear rate of any fashion (or a combination of rates) over time, e.g., exponentially, logarithmically, or sinuso idally. The exposure occurs in the presence of an oxidizing agent or mixture of agents containing oxidant(s). The oxidizing agent may be, for example, oxygen, air, or another gaseous mixture containing an oxidant. A suitable heating device for use with the present invention may work in a similar fashion as a Pyris 6 Thermogravimetric Analyzer (TGA) provided by PerkinElmer Life And Analytical Sciences, Inc. of Waltham, Mass., USA.

Heating device 102 may heat the carbon nanotube material up to a pre-determined high point temperature. The high point temperature may be a temperature above which carbon nanotubes are destroyed during prolonged exposure. Alternatively, the high point temperature may be a temperature higher than the temperature above which carbon nanotubes are destroyed during prolonged exposure. In accordance with this embodiment, the carbon nanotubes may be exposed to potentially damaging temperatures, but for shorter periods of time. The higher temperatures for shorter periods of time burn off more impurities while minimizing damage to the carbon nanotubes. In an exemplary embodiment, the high point may be a temperature of at least about 700 degrees Celsius, e.g., 730 degrees Celsius.

Controller 104 controls heating device 102. Controller 104 may initiate the heating process of heating device 102. Controller 104 may constantly raise the temperature to which the carbon nanotubes are exposed. In an exemplary embodiment, controller 104 may raise the temperature at a predetermined rate over time. Controller 104 may terminate the heating process when a pre-determined high point temperature is reached. The controller 104 may be integrated into the heating device 102 or may be a separate device, such as a programmable logic controller (PLC) or computer, connected to the heating device 102. The controller 104 may generate electronic signals for controlling the heating device 102 and may receive electronic signals from the heating device 102 representing temperature within the heating device 102 for use in controlling the temperature. Suitable controllers will be understood by one of skill in the art from the description herein.

Input device 106 receives input from the user and provides electronic data to controller 104. The electronic data may include instructions to the controller for heating the carbon nanotubes. The instructions may include, for example, instructions to initiate the heating process, instructions to change the rate of increase of the temperature, or instructions to terminate the heating process. In an exemplary embodiment, input device 106 may be a button, keypad, or other electronic interface capable of receiving input from a user. A suitable input device will be understood by one of skill in the art from the description herein.

Output device 108 receives electronic data from controller 104 and outputs the data to the user. The electronic data may include the status of the heating process or the temperature to which the carbon nanotubes are exposed. In an exemplary embodiment, output device 108 may be a monitor, viewscreen, or other electronic device capable of displaying electronic data to a user. A suitable device will be understood by one of skill in the art from the description herein.

Figure 2:
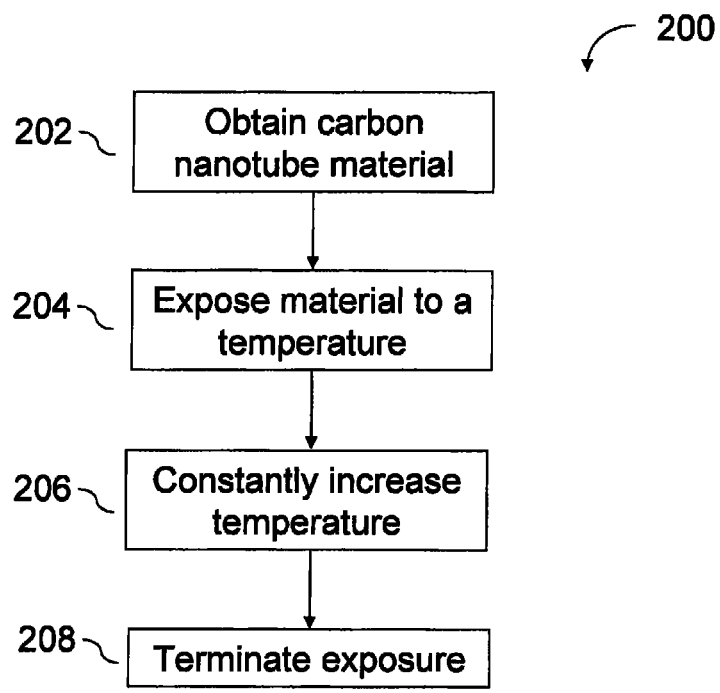
FIG. 2 is a flow chart of exemplary steps for removing impurities from a carbon nanotube material in accordance with an aspect of the present invention.

FIG. 2 is a flow chart 200 depicting exemplary steps for removing impurities from a carbon nanotube material in accordance with one aspect of the present invention. The impurities may consist of carbonaceous impurities such as, for example, amorphous carbon, graphitic carbon, fullerenes, or carbon onions, or metallic impurities such as, for example, iron, nickel, or yttrium. To facilitate description, the steps of FIG. 2 are described with reference to the system components of FIG. 1. It will be understood by one of skill in the art from the description herein that one or more steps may be omitted and/or different components may be utilized without departing from the spirit and scope of the present invention.

In step 202, carbon nanotubes are obtained. The carbon nanotubes may be, for example, single walled carbon nanotubes or other carbonaceous materials. The single walled carbon nanotubes may be as-produced single walled carbon nanotubes or pre-treated single walled carbon nanotubes. In an exemplary embodiment, the carbon nanotubes are produced in another device (not shown) and transferred to the heating device 102. In an alternative embodiment, the carbon nanotubes are produced within the heating device 102.

In step 204, the carbon nanotubes are exposed to a temperature. In an exemplary embodiment, heating device 102 heats the carbon nanotubes. The carbon nanotubes are heated in the presence of a flow or a static atmosphere of an oxidizing agent. The oxidizing agent may be, for example, oxygen, air, or another gaseous mixture containing an oxidant.

In step 206, the temperature is constantly increased. In an exemplary embodiment, controller 104 constantly increases the temperature of heating device 102 from room temperature. In an exemplary embodiment, controller 104 may raise the temperature at a linear rate over time. Controller 104 may, for example, increase the temperature generated by heating device 102 at a rate of 10 degrees Celsius per minute. In an alternative embodiment, controller 104 may raise the temperature at a non-linear rate of any fashion (or a combination of rates) over time, e.g., exponentially, logarithmically, or sinusoidally. As controller 104 constantly increases the temperature, the carbon nanotubes and the impurities they contain are heated. The application of heat causes the impurities to combine with the oxidizing agent. The combination causes the burning of the impurities and results in their release from the carbon nanotubes. The flow rate of the oxidizing agent may be adjusted to maximize the burning of impurities, as would be understood by one of skill in the art from the description herein. The application of heat in the presence of the oxidizing agent may cause carbon nanotubes of a certain chirality to undergo burning and removal from the remaining carbon nanotubes.

In step 208, the exposure of the carbon nanotube material to a temperature is terminated. In an exemplary embodiment, controller 104 may raise the temperature generated by heating device 102 up to a pre-determined high point temperature. The high point temperature may be the temperature above which the carbon nanotube material may become damaged by the heat even by relatively brief exposure. In an exemplary embodiment, the high point may be a temperature of at least about 700 degrees Celsius, e.g., 730 degrees Celsius. Controller 104 may instruct heating device 102 to stop heating the carbon nanotubes when the pre-determined high point temperature is reached. After the heating is stopped, e.g., by reaching room temperature, purified carbon nanotubes may be removed from the heating device 102. Optionally, after the termination of the heating, carbon nanotubes may be cooled using essentially any type of cooling (e.g., Peltier cooler, purging the gas(es) through the chamber, etc.) at essentially any rate. In an exemplary embodiment, the carbon nanotubes are cooled at a rate equal to or faster than the rate of heating.

Steps 204 and 206 may be repeated to remove additional impurities from the carbon nanotube material.

In an exemplary use, 10 mg samples of as-produced single walled carbon nanotubes were processed in accordance with the present invention. The single walled carbon nanotubes were heated (annealed) from room temperature in a PerkinElmer Pyris 6 TGA with a 10 degree Celsius/minute linear rate increase and a 20 ml/minute flow of air. To ease handling, the samples were subject to compressing with acetone. The annealed samples were analyzed and the results of the analysis are discussed below with reference to FIGS. 3-5.

Figure 3:
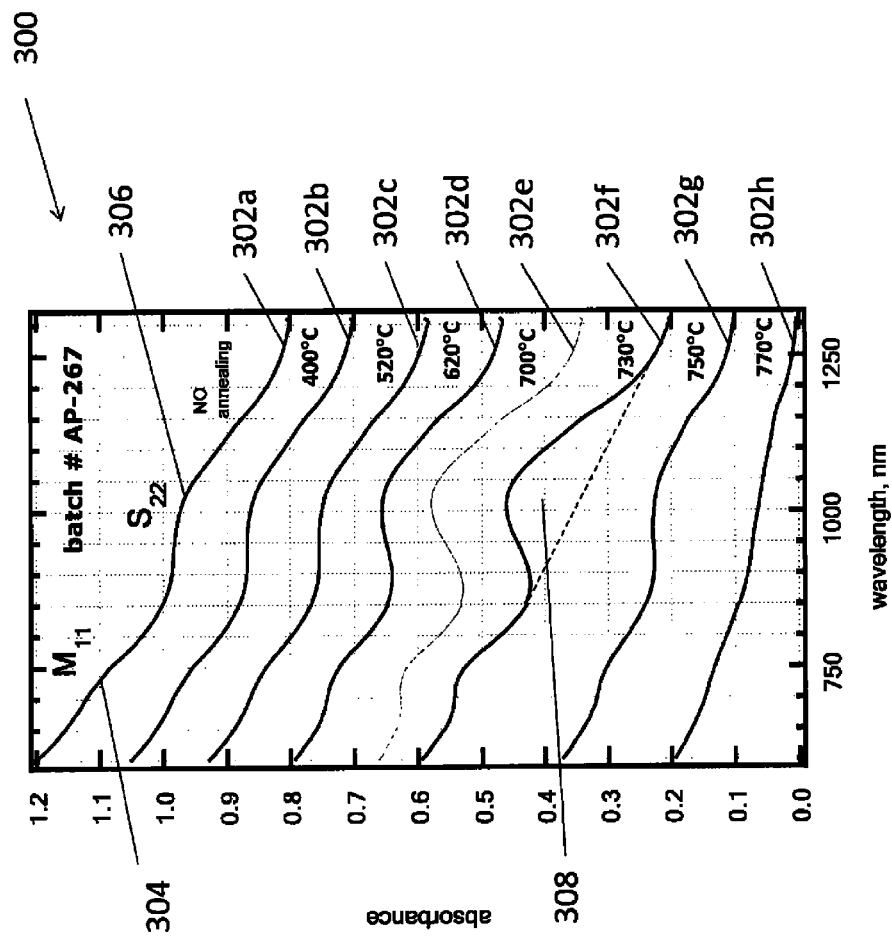
FIG. 3 is a graph of the UV-VIS-NIR absorption spectra of dynamically annealed samples of carbon nanotubes in accordance with an aspect of the present invention.

FIG. 3 depicts a graph 300 of the ultraviolet (UV)-visible (VIS)-near infrared (NIR) absorption spectra of dynamically annealed samples of carbon nanotubes in accordance with one aspect of the present invention. The graph 300 depicts a multitude of lines 302a-h, each line depicting an absorption spectrum of a particular sample. Each line may include peaks $M_{11}$ and $S_{22}$, as illustrated by numbers 304 and 306, respectively. In an exemplary embodiment, peak $S_{22}$ of each absorption spectrum conveys information regarding the purity of the corresponding sample of carbon nanotubes. Specifically, a larger area under the peak, as illustrated for line 302f by number 308, means that fewer impurities are present in the corresponding sample of carbon nanotubes.

Lines 302b-h of graph 300 correspond to absorption spectra for samples of carbon nanotubes that were heated at constantly increasing temperatures up to different high point temperatures pursuant to the steps of flow chart 200. For example, line 302b corresponds to a sample of carbon nanotubes that was exposed to a temperature that constantly increased up to 400 degrees Celsius, and line 302c corresponds to a sample of carbon nanotubes that was exposed to a temperature that constantly increased up to 520 degrees Celsius. Line 302a corresponds to a non-annealed sample.

In the present example, graph 300 depicts line 302f as having the largest area beneath peak $S_{22}$. In graph 300, line 302f corresponds to a sample of carbon nanotubes exposed to heat that was constantly increased up to a temperature of 730 degrees Celsius. Accordingly, heating the carbon nanotubes to 730 degrees Celsius according to the method of flow chart 200 results in the sample of carbon nanotubes having the lowest number of impurities.

Figure 4:
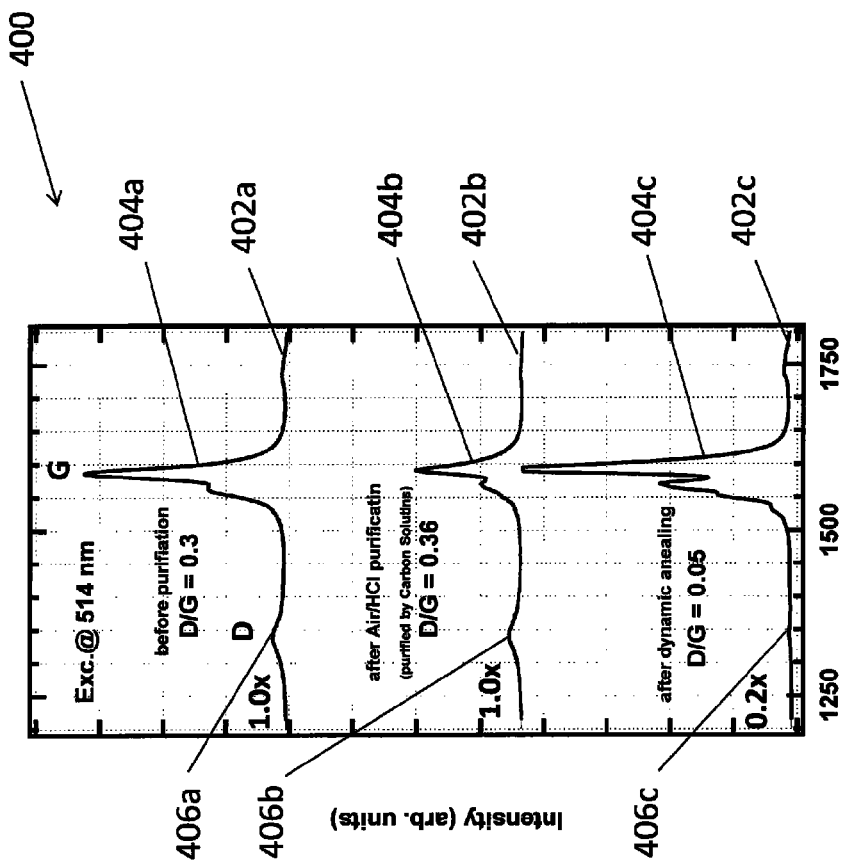
FIG. 4 is a graph of the Raman spectra of samples of carbon nanotubes in the D-band and G-band regions in accordance with an aspect of the present invention.

FIG. 4 depicts a graph 400 of the Raman spectra of samples of carbon nanotubes in the D-band and G-band regions according to one aspect of the present invention. Lines 402a-c correspond to spectra for as-produced single walled carbon nanotubes, conventionally annealed (i.e., at a constant temperature) single walled carbon nanotubes, and dynamically annealed single walled carbon nanotubes pursuant to the method of the present invention, respectively. Each line 402a-c includes two peaks 404a-c (G-band) and 406a-c (D-band) corresponding to carbonaceous impurities in the corresponding sample of carbon nanotubes. The ratio of peaks 406a-c to peaks 404a-c, respectively, is known to indicate the purity of the corresponding sample of single walled carbon nanotubes from carbonaceous impurities. For example, the lower the ratio of peak 406a to 404a, the higher the purity of the corresponding sample.

In the present example, graph 400 depicts line 402c having the smallest ratio between peaks, and therefore indicates the highest purity. Accordingly, the sample of carbon nanotubes that was dynamically annealed according to the method of the present invention achieved a high purity from carbonaceous impurities.

Figure 5:
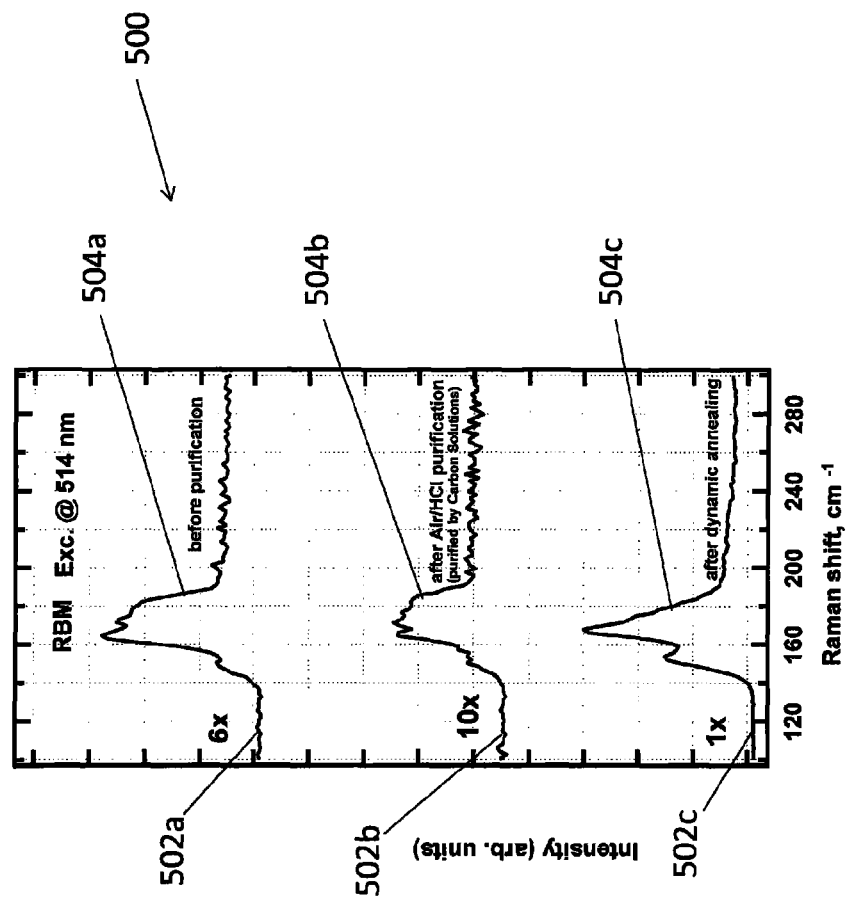
FIG. 5 is a graph of the Raman spectra of samples of carbon nanotubes in the RBM region in accordance with an aspect of the present invention.

FIG. 5 depicts a graph 500 of the Raman spectra of samples of carbon nanotubes in the Radial Breathing Mode (RBM) region according to one aspect of the present invention. Lines 502a-c correspond to spectra for as-produced single walled carbon nanotubes, conventionally annealed (i.e., at a constant temperature) single walled carbon nanotubes, and dynamically annealed single walled carbon nanotubes pursuant to the method of the present invention, respectively. Each line 502a-c includes a group of peak 504a-c in the RBM region, each of which corresponds to carbon nanotubes of different diameters. An absence of the decrease in the relative intensity of the RBM peaks 504c relative to RBM peaks 504a indicates that dynamic annealing leaves carbon nanotubes intact. Accordingly, the sample of carbon nanotubes that was dynamically annealed according to the method of the present invention did not experience any significant decrease in the amount of carbon nanotubes in the sample, indicating that the carbon nanotubes were not destroyed by the relatively short exposure to higher temperatures.

One advantage of aspects of the present invention is the ability to burn and remove impurities while minimizing the destruction of carbon nanotubes. Previous methods involve exposing carbon nanotubes to a constant high temperature to remove impurities. By constantly increasing the temperature, the present invention decreases the amount of time the carbon nanotubes are exposed to the higher temperatures. The high exposed temperatures of the present invention remove a higher number of impurities. However, because of the decrease in the amount of time of exposure to the higher temperatures, the present invention may expose the carbon nanotubes to higher temperatures without damage than the carbon is nanotubes could normally withstand for constant, prolonged exposures.

Another advantage of aspects of the present invention is the ability to achieve higher and more reproducible yields of purified carbon nanotubes. Previous methods had the potential to destroy large quantities of carbon nanotubes during purification due to long periods of exposure at a constant high temperature. As discussed above, the present invention may destroy fewer carbon nanotubes by constantly increasing the temperature to which the nanotubes are exposed. Because fewer carbon nanotubes are in danger of being destroyed, yields of purified carbon nanotubes may be higher and more reproducible using the method of the current invention.

Yet another advantage of aspects of the present invention is a reduced need for fine control over temperature. Previous methods required the exposure of carbon nanotubes to a constant temperature. Thus, fine control over temperature was required to maintain the exposure at the constant temperature. Using the method of the present invention, the temperature may be controlled to constantly increase at a specified rate, e.g., linearly. Because the exposed temperature does not remain at a constant point during the present invention, the need for fine control over the temperature is reduced.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for purifying carbon nanotubes, the method comprising the steps of:
    exposing the carbon nanotubes to a temperature and one or more oxidants; and
    controlling the temperature to purify the carbon nanotubes, without maintaining the carbon nanotubes at a constant temperature, by (1) constantly increasing the temperature while continuously exposing the carbon nanotubes to the one or more oxidants and (2) terminating exposure of the carbon nanotubes to the constantly increasing temperature to minimize destruction of the carbon nanotubes.

2. The method of claim 1, wherein the temperature constantly increases at a linear rate over time.

3. The method of claim 2, wherein the linear rate of increase of the temperature is greater than 10 degrees Celsius per minute.

4. The method of claim 1, wherein the temperature constantly increases at a non-linear rate over time.

5. The method of claim 1, wherein the controlling step includes the step of:
    terminating the exposure of the carbon nanotubes to the temperature after reaching a pre-determined high point temperature.

6. The method of claim 5, wherein the pre-determined high point temperature is above about 700 degrees Celsius.

7. The method of claim 1, wherein the carbon nanotubes are single walled carbon nanotubes.

8. The method of claim 1, wherein the carbon nanotubes are multi-walled carbon nanotubes.

9. The method of claim 2, wherein the linear rate of increase of the temperature is greater than 5 degrees Celsius per minute.

10. The method of claim 1, wherein the controlling step includes:
   (a) constantly increasing the temperature to a pre-determined high point temperature;
   (b) terminating the exposure of the carbon nanotubes to the constantly increasing temperature after reaching the pre-determined high point temperature;
   (c) cooling the carbon nanotubes to room temperature; and
   (d) repeating steps (a)-(c) at least one time.

* * * * *